US006718416B1

United States Patent
Self et al.

(10) Patent No.: US 6,718,416 B1
(45) Date of Patent: Apr. 6, 2004

(54) METHOD AND APPARATUS FOR REMOVING AND INSTALLING A COMPUTER SYSTEM BUS AGENT WITHOUT POWERING DOWN THE COMPUTER SYSTEM

(75) Inventors: Keith M. Self, Aloha, OR (US); Matthew B. Haycock, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 92 days.

(21) Appl. No.: 09/643,379

(22) Filed: Aug. 21, 2000

(51) Int. Cl.$^7$ ............................................... G06F 13/00
(52) U.S. Cl. ...................................... 710/302; 710/300
(58) Field of Search .................................... 710/300, 301, 710/302, 303, 304

(56) References Cited

U.S. PATENT DOCUMENTS

| | | | | |
|---|---|---|---|---|
| 5,404,474 A | * | 4/1995 | Crook et al. ................ | 711/212 |
| 5,524,254 A | * | 6/1996 | Morgan et al. ............. | 710/106 |
| 5,646,553 A | * | 7/1997 | Mitchell et al. ............. | 326/86 |
| 6,040,712 A | * | 3/2000 | Mejia ........................ | 326/82 |
| 6,205,506 B1 | * | 3/2001 | Richardson ................ | 710/305 |
| 6,263,387 B1 | * | 7/2001 | Chrabaszcz ................ | 710/302 |
| 6,401,157 B1 | * | 6/2002 | Nguyen et al. ............. | 710/302 |

FOREIGN PATENT DOCUMENTS

DE          0241905          * 10/1987 ........... G06F/13/40

* cited by examiner

Primary Examiner—Tim Vo
(74) Attorney, Agent, or Firm—Calvin E. Wells

(57) ABSTRACT

An example embodiment of a computer system that includes a removable agent that can be removed or installed without powering down the system includes a fixed bus agent and the replaceable bus agent. The fixed bus agent and the replaceable bus agent are electrically coupled together by a presence detect signal, a synchronization signal, and a data bus. A deassertion of the presence detect signal indicates to the fixed bus agent that the removable bus agent has been disconnected and is no longer electrically coupled to the fixed bus agent. The fixed bus agent then tri-states its outputs and also prevents potentially invalid data from being delivered to the core circuitry of the fixed bus agent. An assertion of the presence detect signal indicates to the fixed bus agent that the replaceable bus agent is electrically connected to the fixed bus agent. In response to the assertion of the presence detect signal, the fixed bus agent and the replaceable bus agent enter reset periods. Following the reset periods and when each bus agent is ready to communicate to the other agent, the fixed bus agent and the replaceable bus agent signal to each other over the synchronization signal that each is ready to begin communication over the data bus.

14 Claims, 5 Drawing Sheets

METHOD AND APPARATUS FOR REMOVING AND INSTALLING A COMPUTER SYSTEM BUS AGENT WITHOUT POWERING DOWN THE COMPUTER SYSTEM

FIELD OF THE INVENTION

The present invention pertains to the field of computer systems. More particularly, this invention pertains to the field of removing and installing a bus agent while a computer system is receiving power.

BACKGROUND OF THE INVENTION

Server computer systems have a need to be nearly constantly functional. It is important for server systems to be operational for as great a percentage of time as possible. When a subsystem of a server computer system fails, the server typically must be powered down and a technician must remove the failing subsystem and install a functional subsystem. The types of subsystems that may require such maintenance may include processors, peripheral components, memory devices, memory controllers, and other subsystem types. The removal and installation of subsystems may occur whenever a failure is detected, or the maintenance may occur on a regular schedule. In any event, the need to power down the server results in the server becoming unavailable for a period of time. This period of unavailability is undesirable, as it will in many cases interfere with critical network services.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

An example embodiment of a computer system that includes a removable agent that can be removed or installed without powering down the system includes a fixed bus agent and the replaceable bus agent. The fixed bus agent and the replaceable bus agent are electrically coupled together by a presence detect signal, a synchronization signal, and a data bus. The term "fixed bus agent" as used herein is meant to include any bus agent that continues to receive power during a removal or installation of a replaceable bus agent.

For a removal of the replaceable bus agent, a deassertion of the presence detect signal indicates to the fixed bus agent that the removable bus agent has been disconnected and is no longer electrically coupled to the fixed bus agent. The fixed bus agent then tri-states its outputs and also prevents potentially invalid data from being delivered to the core circuitry of the fixed bus agent. The potentially invalid data occurs as a result of the noise on the data bus that may result from the disconnection of the replaceable bus agent.

For an installation of the replaceable bus agent, an assertion of the presence detect signal indicates to the fixed bus agent that the replaceable bus agent is electrically connected to the fixed bus agent. In response to the assertion of the presence detect signal, the fixed bus agent and the replaceable bus agent begin initialization processes. When each bus agent is ready to communicate to the other agent, the fixed bus agent and the replaceable bus agent signal to each other over the synchronization signal that each is ready to begin communication over the data bus. The fixed bus agent may be ready to begin communication earlier than the replaceable bus agent as the replaceable bus agent can not recognize the presence detect signal assertion until the replaceable bus agent's power has stabilized.

Figure 1:
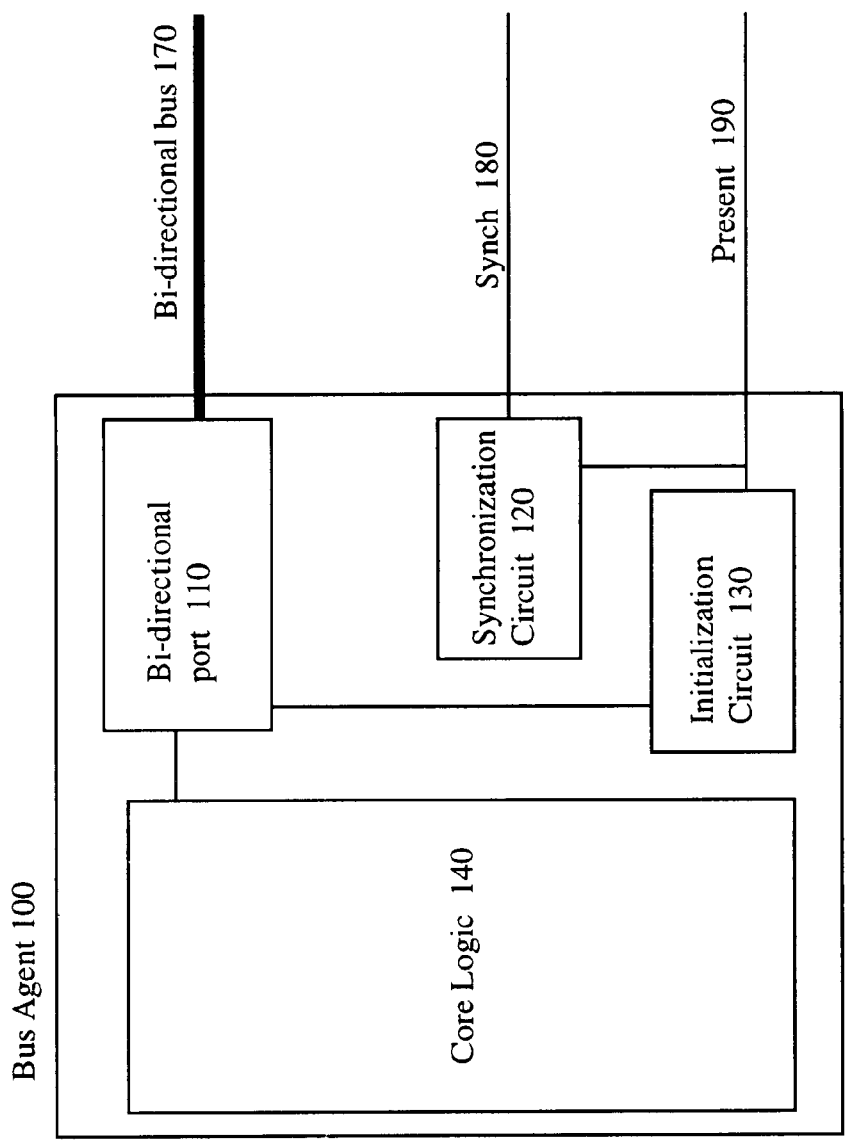
FIG. 1 is a block diagram of one embodiment of a bus agent including a bi-directional bus port, a synchronization circuit, a presence detect circuit, and a core logic circuit.

FIG. 1 is a block diagram of a bus agent 100. The bus agent 100 may be a processor, peripheral device, memory controller, memory device, or other computer subsystem type. The bus agent 100 includes a bi-directional port 110 coupled to a bi-directional bus 170. The bi-directional bus 170 may be a simultaneous bi-directional bus where two bus agents can send data across the bus simultaneously. Other implementations are possible using other types of busses.

The bus agent 100 further includes a synchronization circuit 120 coupled to a synch signal 180 and also includes an initialization circuit 130 coupled to a presence detect signal (Present) 190. The bus agent additionally includes a core logic circuit 140.

The bus agent 100 may be implemented as a fixed bus agent (always receives power while the computer system is in operation) or a replaceable bus agent. If the bus agent 100 is implemented as a fixed bus agent, then when Present 190 is not asserted the bi-directional port 110 tri-states its outputs. Also, no data from the bi-directional port 110 is forwarded to the core logic 140. Further, the synchronization circuit 120 pulls the synch signal 180 towards a logical voltage level indicating a deasserted state.

If the bus agent 100 is a fixed bus agent and the present signal 190 becomes asserted, indicating that a replaceable bus agent is now coupled to the fixed bus agent, then the initialization circuit 130 begins a re-initialization process. After a predetermined reset period, the synchronization circuit 120 attempts to communicate with the replaceable bus agent by pulling Synch 180 towards a logical voltage level indicating an asserted state.

If the bus agent 100 is implemented as a replaceable bus agent, then when Present 190 is asserted an initialization process begins. After power has stabilized at the replaceable bus agent and following an initialization period, the synchronization circuit 120 attempts to communicate with a fixed bus agent by pulling Synch 180 towards a logical voltage level indicating an asserted state. Only when both the fixed bus agent and the replaceable bus agent are pulling Synch 180 towards an asserted state will the Synch 180 become asserted and each bus agent then understands that the other bus agent is ready to begin communicating over the bi-directional bus 170.

Figure 2:
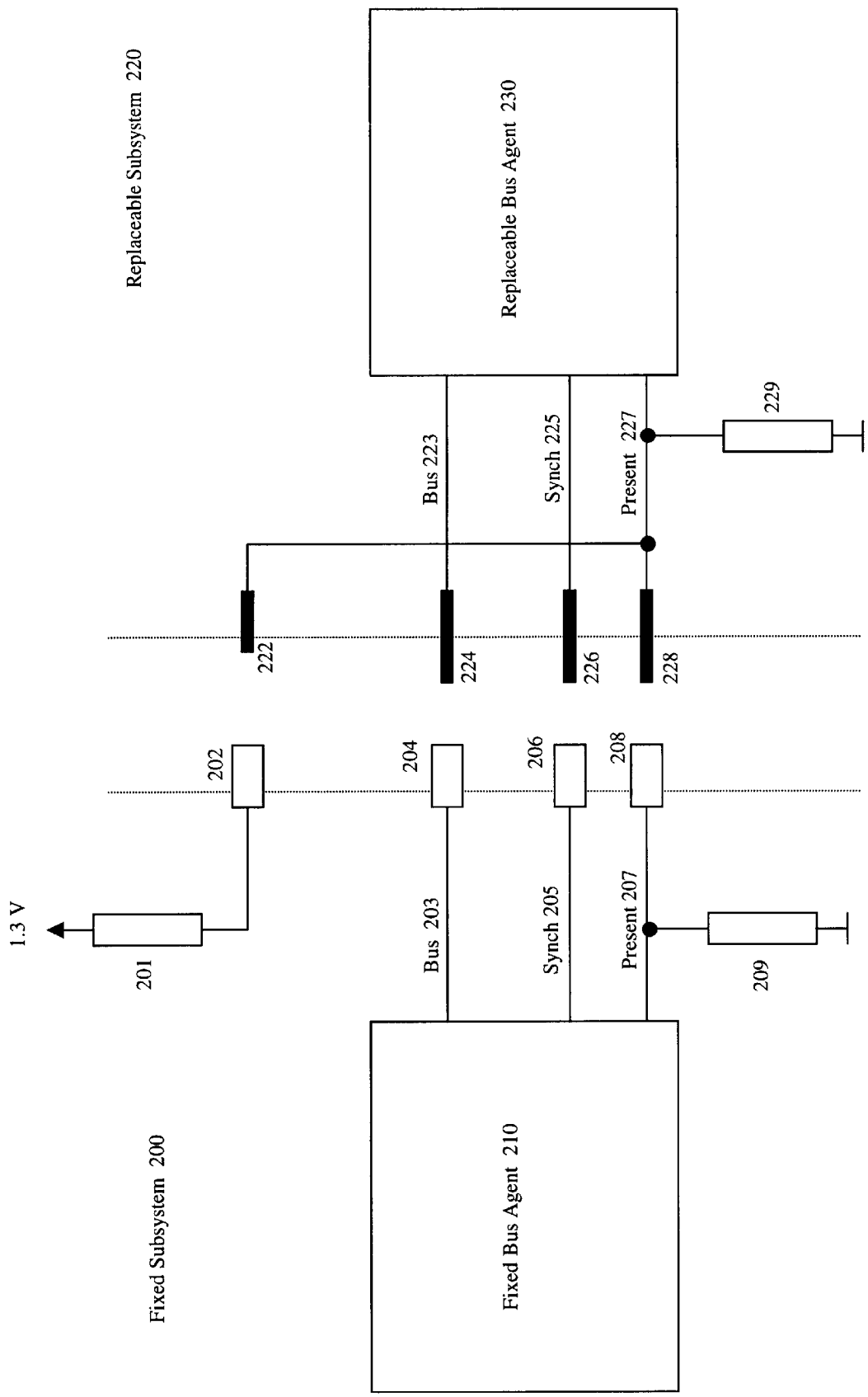
FIG. 2 is block diagram of one embodiment of a computer system including a fixed subsystem and a replaceable subsystem.

FIG. 2 is a block diagram of a computer system including a fixed subsystem 200 and a replaceable subsystem 220. The replaceable subsystem 220 is installed into the computer system of FIG. 2 by pressing pins 222, 224, 226, and 228 into sockets 202, 204, 206, and 208. Typical implementations may include more pins and sockets. For example, FIG. 2 shows only a single pin and socket for a bus 203. However, one embodiment may include as many as 64 pins and sockets for bus 203. Other implementations are possible with other amounts of pins and sockets. Still other implementations are possible using other techniques or devices for connecting the various signals and busses shown in FIG. 2.

The fixed subsystem 200 includes a fixed bus agent 210 coupled to the bus 203, a synchronization signal (Synch) 205, and a presence detect signal (Present) 207. The bus agent 210 may be similar to the bus agent described above in connection with FIG. 1. The bus 203 is coupled to the socket 204, Synch 205 is coupled to the socket 206, and Present 207 is coupled to the socket 208. Present 207 is tied to a logically low voltage level (perhaps 0V) through a pull-down resistor 209. The pull-down resistor 209 may have a value of approximately 50 kOhms, although other implementations are possible using other resistance values. The pull-down resistor 209 ensures that Present 207 remains deasserted while the replaceable subsystem 220 is not installed. When Present 207 is not asserted, the fixed bus agent 210 tri-states its outputs and does not forward any data to the core logic of the bus agent 210. Also, when Present 207 is not asserted, the fixed bus agent 210 pulls Synch 205 towards a deasserted state.

The fixed subsystem 200 also includes a pull-up resistor 201 that ties the socket 202 to a logically high voltage level. The logically high voltage level may be approximately 1.3V, although other implementations are possible using other voltage levels. The pull-up resistor 201 may have a resistance value of approximately 2 kOhms, although other resistance values are possible.

The replaceable subsystem 220 includes a replaceable bus agent 230 coupled to a bus 223, a synchronization signal (Synch) 225, and a presence detect signal (Present) 227. The replaceable bus agent 230 may be similar to the bus agent described above in connection with FIG. 1. The bus 223 is coupled to the pin 224, Synch 225 is coupled to the pin 226, and Present signal 227 is coupled to the pin 228. Present 227 is tied to a logically low voltage level (perhaps 0V) through a pull-down resistor 229. The pull-down resistor 229 may have a value of approximately 50 kOhms, although other implementations are possible using other resistance values. The pull-down resistor 229 ensures that Present 227 remains deasserted while the replaceable subsystem 220 is not installed. When Present 227 is not asserted, the replaceable bus agent 220 tri-states its outputs. Also, when Present 227 is not asserted, the replaceable bus agent 230 pulls Synch 225 towards a deasserted state.

When the replaceable subsystem 220 is installed, the present signals 207 and 227 are coupled together and are pulled up towards the logically high voltage level through the pull-up resistor 201. Because the pull-up resistor 201 is much smaller in value than the pull-down resistors 209 and 229, the pull-up resistor 201 is able to pull the present signals 207 and 227 to an asserted state. This assertion of the present signals 207 and 227 will cause the fixed bus agent 210 and the replaceable bus agent 230 to begin an initialization process, although the fixed bus agent may begin its process earlier than the replaceable agent due to the fact that the replaceable agent cannot respond to an assertion of Present 227 until power has stabilized at the replaceable agent and the replaceable agent has been reset. After a period of time following the assertion of Present 207, the fixed bus agent 210 pulls the synch signals 205 and 225 towards and asserted state. Also, after a period of time following the assertion of Present 227, the replaceable bus agent 230 pulls the synch signals 225 and 205 towards an asserted state. The fixed bus agent 210 and the replaceable bus agent 230 are configured in a way such that only when both the fixed bus agent 210 and the replaceable bus agent 230 are pulling towards the asserted state will the synch signals 205 and 225 actually become asserted. If either of the bus agents 210 and 230 are pulling the synch signals 205 and 225 towards a deasserted state, then the synch signals 205 and 225 will remain deasserted. In this manner, when the synch signals 205 and 225 are asserted the fixed bus agent 210 and the replaceable bus agent 230 each knows that the other bus agent is ready to begin communication over the bus 203 and 223. The bus 203 and 223 may be a simultaneous bi-directional bus.

In the computer system of FIG. 2, the pin 222 is shorter than the pins 224, 226, and 228. This ensures that the pins 224, 226, and 228 are engaged with sockets 204, 206, and 208 before the present signals 207 and 227 become asserted. This configuration is beneficial as it ensures that the bus 203/223, and the synch signals 205 and 225 are electrically coupled before the bus agents 210 and 230 receive an indication by way of the present signals 207 and 227 that the replaceable bus agent 230 is connected to the fixed bus agent 210. Similarly, when the replaceable subsystem is removed, the pin 222 is the first pin to lose contact with its socket and the present signals 207 and 227 become deasserted before the busses 203 and 223 and the synch signals 205 and 225 become disconnected. This configuration allows the fixed bus agent time to prevent invalid data occurring on the bus 203 from being transferred to the core logic of the fixed bus agent 210.

Figure 3:
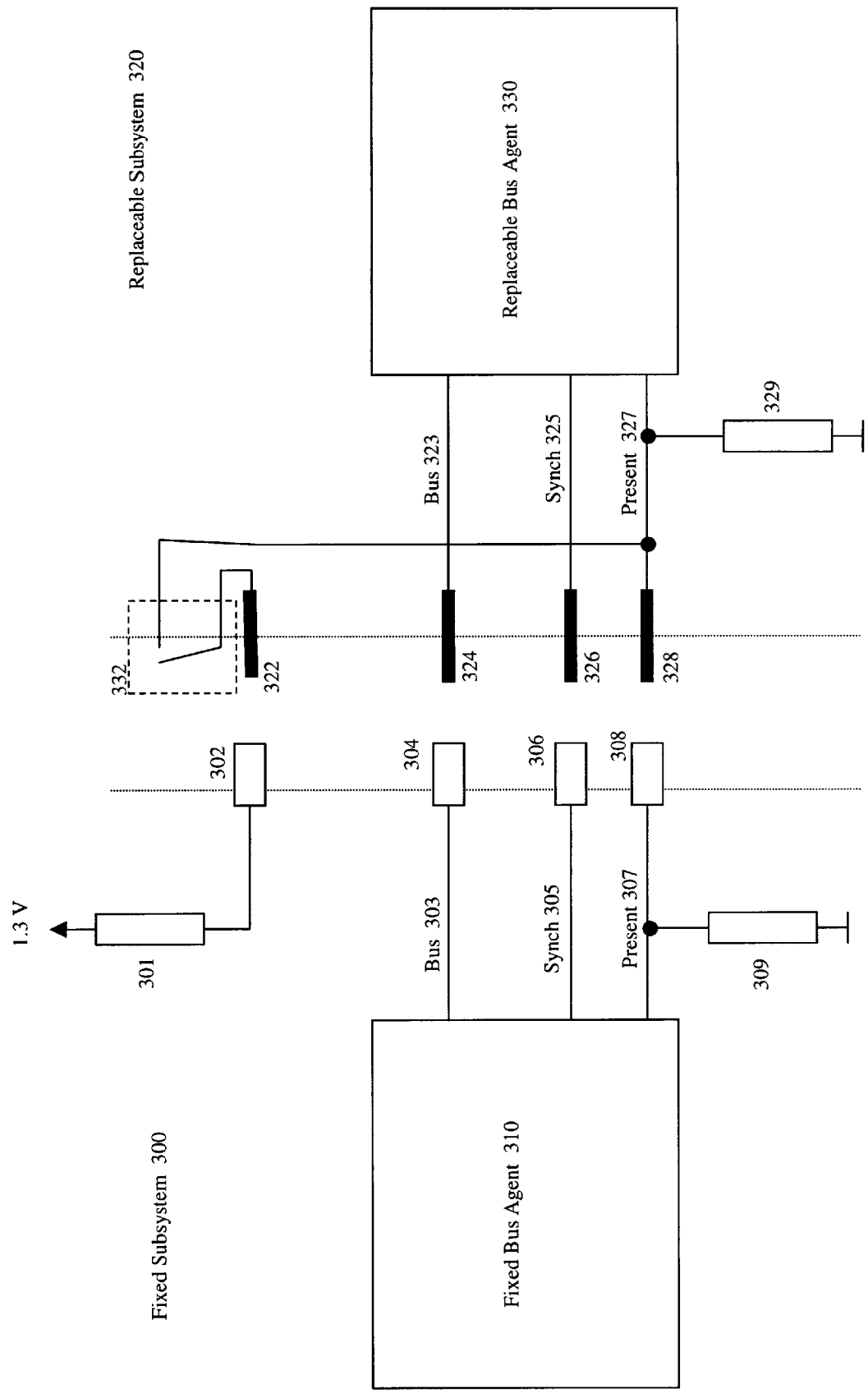
FIG. 3 is a block diagram of an additional embodiment of a computer system including a fixed subsystem and a replaceable subsystem.

FIG. 3 is a block diagram of a computer system including a fixed subsystem 300 and a replaceable subsystem 320. The computer system of FIG. 3 is similar in most respects to the system of FIG. 2, discussed above. The replaceable subsystem 320 is installed into the computer system of FIG. 3 by pressing pins 322, 324, 326, and 328 into sockets 302, 304, 306, and 308. Typical implementations may include more pins and sockets. For example, FIG. 3 shows only a single pin and socket for a bus 303/323. However, one embodiment may include as many as 64 pins and sockets for bus 303/323. Other implementations are possible with other amounts of pins and sockets. Still other implementations are possible using other techniques or devices for connecting the various signals and busses shown in FIG. 3.

The fixed subsystem 300 includes a fixed bus agent 310 coupled to the bus 303, a synchronization signal (Synch) 305, and a presence detect signal (Present) 307. The bus agent 310 may be similar to the bus agent described above in connection with FIG. 1. The bus 303 is coupled to the socket 304, Synch 305 is coupled to the socket 306, and Present 307 is coupled to the socket 308. Present 307 is tied to a logically low voltage level (perhaps 0V) through a pull-down resistor 309. The pull-down resistor 309 may have a value of approximately 50 kOhms, although other implementations are possible using other resistance values. The pull-down resistor 309 ensures that Present 307 remains deasserted while the replaceable subsystem 320 is not installed. When Present 307 is not asserted, the fixed bus agent 310 tri-states its outputs and does not forward any data to the core logic of the bus agent 310. Also, when Present 307 is not asserted, the fixed bus agent 310 pulls Synch 305 towards a deasserted state.

The fixed subsystem 300 also includes a pull-up resistor 301 that ties the socket 302 to a logically high voltage level.

The logically high voltage level may be approximately 1.3V, although other implementations are possible using other voltage levels. The pull-up resistor 301 may have a resistance value of approximately 2 kOhms, although other resistance values are possible.

The replaceable subsystem 320 includes a replaceable bus agent 330 coupled to a bus 323, a synchronization signal (Synch) 325, and a presence detect signal (Present) 327. The replaceable bus agent 330 may be similar to the bus agent described above in connection with FIG. 1. The bus 323 is coupled to the pin 324, Synch 325 is coupled to the pin 326, and Present 327 is coupled to the pin 328. Present 327 is tied to a logically low voltage level (perhaps 0V) through a pull-down resistor 329. The pull-down resistor 329 may have a value of approximately 50 kOhms, although other implementations are possible using other resistance values. The pull-down resistor 329 ensures that Present 327 remains deasserted while the replaceable subsystem 320 is not installed. When Present 327 is not asserted, the replaceable bus agent 320 tri-states its outputs. Also, when Present 327 is not asserted, the replaceable bus agent 330 pulls Synch 325 towards a deasserted state.

When the replaceable subsystem 320 is installed, the present signals 307 and 327 are coupled together and are pulled up towards the logically high voltage level through the pull-up resistor 301. Because the pull-up resistor 301 is much smaller in value than the pull-down resistors 309 and 329, the pull-up resistor is able to pull the present signals 307 and 327 to an asserted state. This assertion of the present signals 307 and 327 causes the fixed bus agent 310 and the replaceable bus agent 330 to begin an initialization process. After a period of time following the assertion of the present signal 307, the fixed bus agent 310 pulls the synch signals 305 and 325 towards an asserted state. Also, after a period of time following the assertion of the present signal 327, the replaceable bus agent 330 pulls the synch signals 325 and 305 towards an asserted state. The replaceable agent may begin pulling Synch 325 to an asserted state at a later time than the fixed agent due to the fact that the replaceable agent cannot respond to an assertion of Present 327 until the power at the replaceable agent has stabilized. The fixed bus agent 310 and the replaceable bus agent 330 are configured such that only when both the fixed bus agent 310 and the replaceable bus agent 330 are pulling towards the asserted state will the synch signals 305 and 325 actually become asserted. If either of the bus agents 310 and 330 are pulling the synch signals 305 and 325 towards a deasserted state, then the synch signals 305 and 325 will remain deasserted. In this manner, when the synch signals 305 and 325 are asserted the fixed bus agent 310 and the replaceable bus agent 330 each knows that the other bus agent is ready to begin communication over the bus 303 and 323. The bus 303 and 323 may be a simultaneous bi-directional bus.

In the computer system of FIG. 3, the pin 322 is the same length as the pins 324, 326, and 328. However, a switch 332 is included between the pin 322 and the present signal 327. The switch closes when the replaceable subsystem is substantially installed and after the pins 304 and 306 have made contact with the sockets 324 and 326, respectively. This ensures that the pins 324, 326, and 328 are engaged with sockets 304, 306, and 308 before the present signals 307 and 327 become asserted. This configuration is beneficial as it ensures that the bus 303/323, and the synch signals 305 and 325 are electrically coupled before the bus agents 310 and 330 receive an indication by way of the present signals 307 and 327 that the replaceable bus agent 330 is connected to the fixed bus agent 310. Similarly, when the replaceable subsystem is removed, the switch opens and the present signals 307 and 327 become deasserted before the busses 303 and 323 and the synch signals 305 and 325 become disconnected. This configuration allows the fixed bus agent time to prevent invalid data occurring on the bus 303 from being transferred to the core logic of the fixed bus agent 310.

Figure 4:
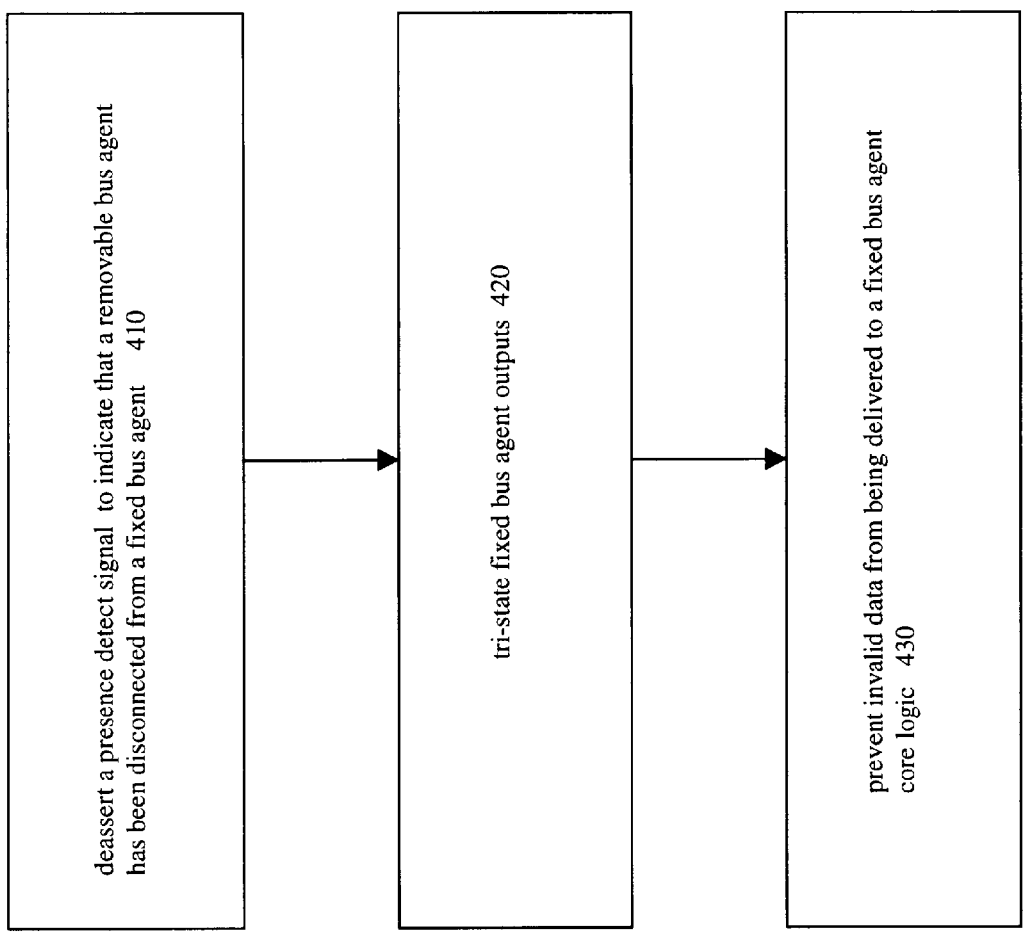
FIG. 4 is a flow diagram of one embodiment of a method for removing a replaceable bus agent.
Figure 5:
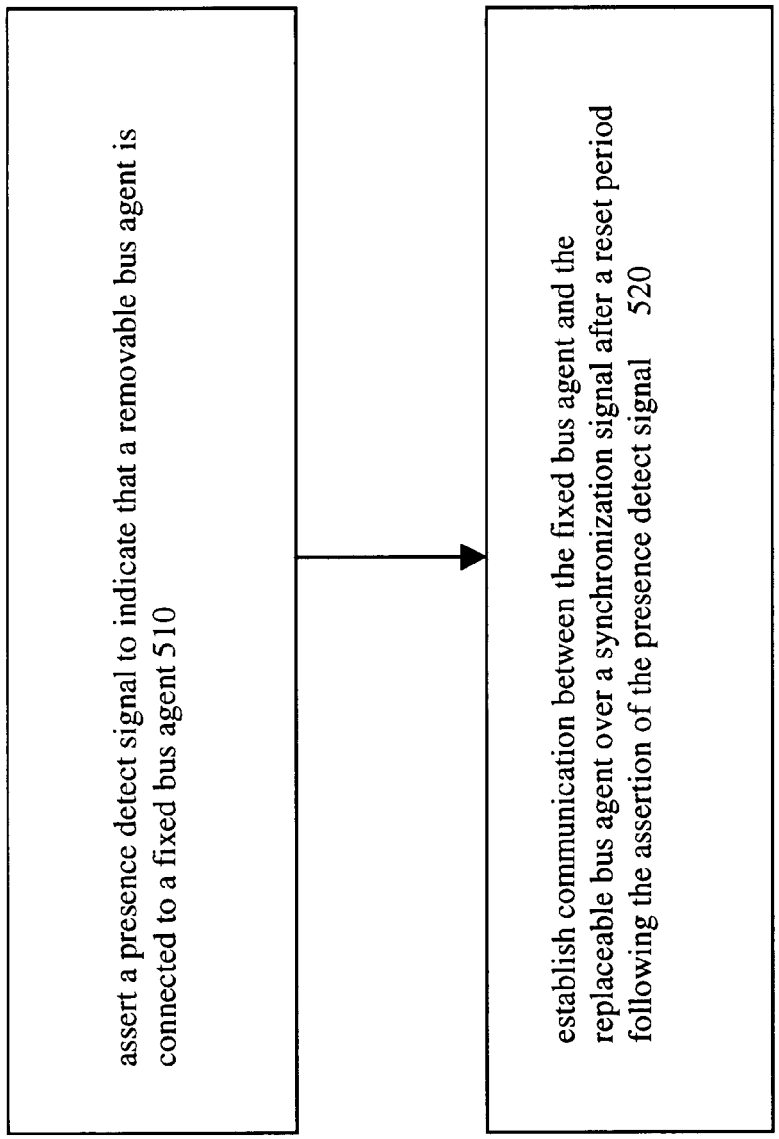
FIG. 5 is a flow diagram of one embodiment of a method for installing a replaceable bus agent.

FIG. 4 is a flow diagram of one embodiment of a method for removing a replaceable bus agent without powering down the computer system. At block 410, a presence detect signal is deasserted, indicating that the removable bus agent has been disconnected from a fixed bus agent. Following the deassertion of the presence detect signal, the fixed bus agent tri-states its outputs at block 420. At block 430 the fixed bus agent prevents invalid data from being delivered to the core logic of the fixed bus agent. FIG. 5 is a flow diagram of an embodiment of a method for installing a replaceable bus agent without powering down a computer system. At block 510, a presence detect signal is asserted to indicate that a removable bus agent is connected to a fixed bus agent. At block 520, communication is established between the fixed bus agent and the replaceable bus agent. The communication takes place using a synchronization signal after an initialization period following the assertion of the presence detect signal.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances of "an embodiment," "one embodiment," or "some embodiments" are not necessarily all referring to the same embodiments.

What is claimed is:

1. An apparatus, comprising:
   a bus interface;
   a presence detect signal input to receive a presence detect signal, an assertion of the presence detect signal to indicate that a replaceable bus agent is coupled to the bus interface;
   a synchronization signal input/output circuit to establish communication with the replaceable bus agent over a synchronization signal in response to the assertion of the presence detect signal; and
   an initialization circuit to prevent the synchronization signal input/output circuit from establishing communication with the replaceable bus agent before a predetermined initialization period elapses, the predetermined initialization period beginning at the assertion of the presence detect signal.

2. The apparatus of claim 1, a deassertion of the presence detect signal to indicate that the replaceable bus agent is not coupled to the bus interface.

3. The apparatus of claim 2, further comprising a core logic circuit, the bus interface to prevent invalid data from being delivered to the core logic circuit following the deassertion of the presence detect signal.

4. The apparatus of claim 3, the bus interface including a simultaneous bi-directional bus port.

5. A replaceable bus agent, comprising:

a bus interface;

a presence detect signal input to receive a presence detect signal, an assertion of the presence detect signal to indicate that the replaceable bus agent is coupled to a fixed bus agent;

a synchronization signal input/output circuit to establish communication with the fixed bus agent over a synchronization signal in response to the assertion of the presence detect signal; and an initialization circuit to prevent the synchronization signal input/output circuit from establishing communication with the fixed bus agent before a predetermined initialization period elapses, the predetermined initialization period beginning at the assertion of the presence detect signal.

6. The replaceable bus agent of claim 5, a deassertion of the presence detect signal to indicate that the replaceable bus agent is not coupled to the fixed bus agent.

7. The replaceable bus agent of claim 6, the bus interface including a simultaneous bi-directional bus port.

8. A system, comprising:

a fixed subsystem including a fixed bus agent, the fixed bus agent including a bus interface, a presence detect signal input, and a synchronization signal input/output circuit, a presence detect signal socket coupled to the fixed bus agent presence detect signal input, a pull-down resistor coupled between the presence detect signal socket and a logically low voltage level, a synchronization signal socket coupled to the fixed bus agent synchronous signal input/output circuit, a pull-up voltage socket coupled to a logically high voltage level through a pull-up resistor, and at least one bus socket coupled to the bus interface; and a replaceable subsystem including a replaceable bus agent, the replaceable bus agent including a bus interface, a presence detect signal input, and a synchronization signal input/output circuit, a presence detect signal pin coupled to the replaceable bus agent presence detect signal input, the presence detect signal pin to provide an electrical path to the fixed bus agent presence detect signal input when the presence detect signal pin is inserted into the presence detect signal socket, a pull-down resistor coupled between the presence detect signal pin and a logically low voltage level, a synchronization signal pin coupled to the replaceable bus agent synchronous signal input/output circuit, the synchronization signal pin to provide an electrical path to the fixed bus agent synchronization signal input/output circuit when the synchronization signal pin is inserted into the synchronization signal socket, a pull-up voltage pin coupled to the presence detect signal input, the pull-up voltage pin to provide an electrical path to the logically high voltage level through the pull-up resistor when the pull-up voltage pin is inserted into the pull-up voltage socket, and at least one bus pin to provide an electrical connection between the replaceable bus agent bus interface and the fixed bus agent bus interface when the bus pin is inserted into the bus socket.

9. The system of claim 8, the fixed subsystem pull-down resistor to provide the logically low voltage level to the fixed bus agent presence detect signal input and the replaceable subsystem pull-down resistor to provide the logically low voltage level to the replaceable bus agent presence detect signal input when the presence detect signal pin is not inserted into the presence detect signal socket.

10. The system of claim 9, the pull-up resistor smaller in value than the fixed subsystem pull-down resistor and the replaceable subsystem pull-down resistor, the pull-up resistor to provide a logically high voltage level to the fixed bus agent and replaceable bus agent presence detect signal inputs when the pull-up voltage pin is inserted into the pull-up voltage socket, the logically high voltage level to indicate to the fixed bus agent and the replaceable bus agent that the replaceable bus agent has been coupled to the fixed bus agent.

11. The system of claim 10, the fixed bus agent and the replaceable bus agent to establish communication with each other over the synchronization signal in response to the logically high voltage level on the presence detect signal.

12. The system of claim 11, the pull-up voltage pin shorter in length than the presence detect signal pin and the synchronization signal pin in order to ensure that the synchronization signal pin is inserted into the synchronization signal socket before the presence detect signal is pulled up to the logically high voltage level.

13. The system of claim 11, further comprising a switch placed in series between the pull-up voltage socket and the replaceable present detect signal pin, the switch closed when the pull-up voltage pin is substantially engaged into the pull-up voltage socket, the switch to ensure that the synchronization signal pin is engaged before the logically high voltage level is applied to the presence detect signal.

14. A method, comprising:

asserting a presence detect signal to indicate that a removable bus agent is connected to a fixed bus agent; and establishing communication between the fixed bus agent and the replaceable bus agent over a synchronization signal after an initialization period following the assertion of the presence detect signal wherein establishing communication between the fixed bus agent and the removable bus agent includes the fixed bus agent pulling the synchronization signal toward a first logical voltage level following the fixed bus agent initialization period and the replaceable bus agent pulling the synchronization signal toward the first logical voltage level following the replaceable bus agent initialization period, the synchronization signal to remain at a second logical voltage level until both the fixed bus agent and the replaceable bus agent simultaneously pull the synchronization signal to the first logical voltage level.

* * * * *